July 11, 1939.  R. D. MARX  2,165,639

VALVE

Filed April 1, 1937

INVENTOR
Robert N. Marx
BY
Morgan Finnegan Durham
ATTORNEYS

Patented July 11, 1939

2,165,639

UNITED STATES PATENT OFFICE 2,165,639

VALVE

Robert D. Marx, Brooklyn, N. Y.

Application April 1, 1937, Serial No. 134,198

1 Claim. (Cl. 284—18)

The present invention relates to novel and useful improvements in valves, and more particularly to valves particularly adapted for use in connection with tanks for oil, gasoline and the like.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Figure 1:
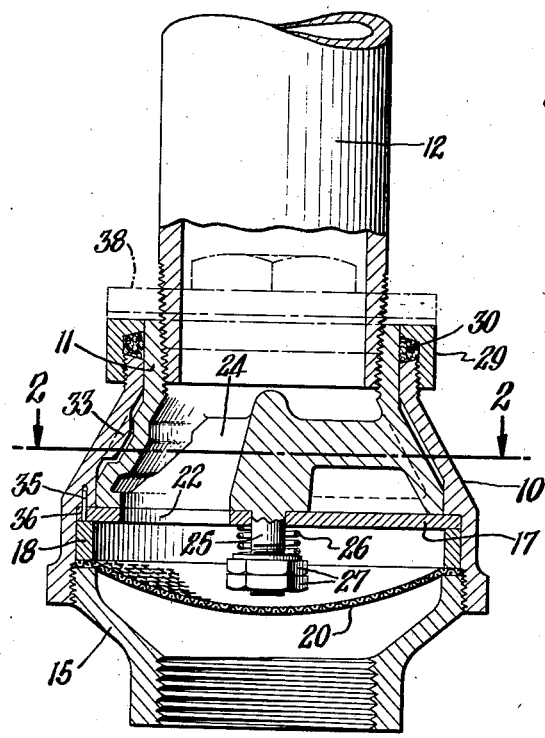
Figure 1 is a side elevation, partly in section, of an illustrative embodiment of the present invention and showing the invention as applied to a curb-fill valve.
Figure 2:
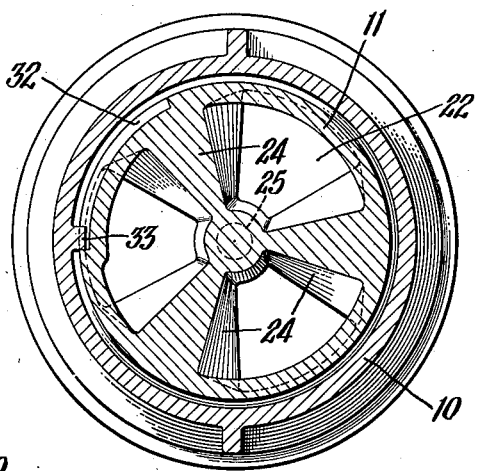
Figure 2 is a sectional view taken on the line 2—2 of Figure 1.
Figure 3:
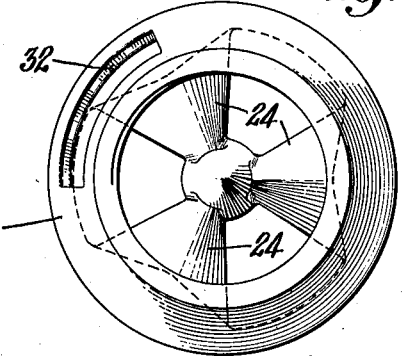
Figure 3 is a plan view of the embodiment shown in Figure 1.

The present invention has for its object the provision of a novel and improved curb fill valve which automatically opens and closes as the connecting hose is tightened or loosened. A further object is the provision of a valve particularly adapted for use in connection with the fill pipes for tanks containing inflammable or other dangerous liquids. Still another object is the provision of a valve which insures that a tight connection is made before the valve can be opened, and is automatically closed as soon as an attempt is made to loosen the connection. The invention also provides a valve which does not impede the flow of liquid, which is also not subject to excessive wear, and which is necessarily closed before the coupling can be disconnected.

In accordance with the present invention, as illustratively embodied, there is provided a valve body having a generally hollow, tubular shape, provided with cooperating valve members intermediate the ends of the body, and one of these valve members is connected with a rotatable body to which the threaded pipe connection is made so that when the pipe connection is tight, a slight further turn of the pipe causes the valve to be automatically opened, and when the pipe is backed off slightly, the valve is opened by the first portion of the turning movement, thereby preventing the valve being open while the threads are loose and liable to allow gasoline or other dangerous liquid to escape.

It will be understood that the foregoing general description and the following detailed description as well are exemplary and explanatory of the invention but are not restrictive thereof.

Referring now in detail to the illustrative embodiment of the invention as shown in the accompanying drawing, there is provided a valve body comprising a hollow tubular member 10, having an interior diameter somewhat in excess of the pipe size, and within this member is received a closely fitted tubular member 11 having its upper and cylindrical end threaded to receive the threaded pipe 12 which is customarily provided at the end of the hose carried by a tank wagon.

At the lower end of the valve body 10 is provided a coupling flange 15, which is threadedly connected with the body 10, and the body 10 is recessed to receive the valve disc 17, spacing ring 18 and fire screen 20, these parts being retained by the upper rim of the coupling flange 15.

Figure 4:
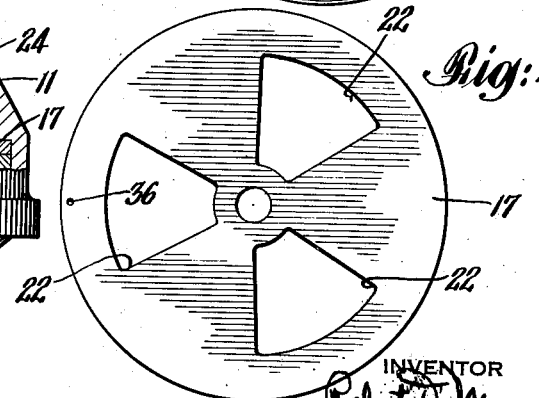
Figure 4 is a detailed plan view of the valve disc used in the embodiment shown in the other figures.
Figure 5:
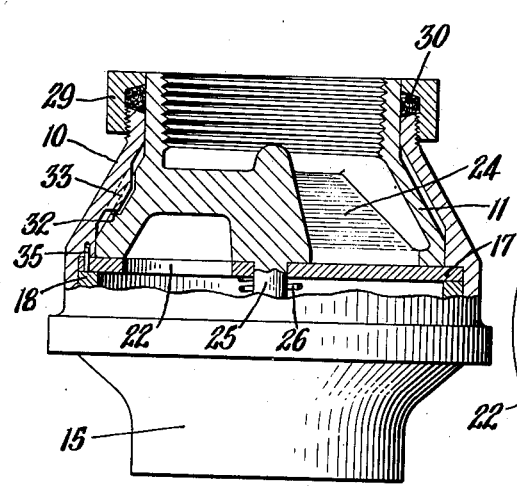
Figure 5 is a fragmentary view, similar to Figure 1, but showing the valve in closed position.

The valve comprises the valve disc 17 shown in Figure 4 provided with three segmental valve openings 22, and a cooperating closure member 24 provided with three recessed segmental members of the general shape of opening 22, but slightly larger and spaced so as to simultaneously seal the three openings 22. The segmental members 24 are formed as a spider integrally with the tubular member 11, and are maintained in tightly seated position against the valve disc 17 by means of the integral pin 25 and spring 26. Spring 26 is variably compressed by the locking washers 27.

A packing ring 30 is provided around the cylindrical neck of the tubular member 11, and is maintained in tight sealing engagement by means of the threaded part 29, this ring also serving to prevent easy rotation of the tubular member 11 with reference to the valve body 10. Means are also provided for limiting the relative rotation of the members 10 and 11, and as embodied, the internal member 11 is provided with a circumferential recess 32 while the outer member 10 is provided with an inwardly projecting stop 33, the recess 32 and stop 33 being so shaped as to permit assembly of the parts. A pin 35 seated in the valve body 10 projects through an aperture 36 in the valve disc 17, and locates the valve disc with reference to the stop 33.

In order to avoid impeding the flow of liquid through the valve, the internal bore of the rotatable tubular member 11 is gradually enlarged, and the upper surfaces of the valve closing segment 24 are streamlined so as to reduce turbulence, while the valve openings 22 are preferably slightly larger in area than the internal area of the pipe 12.

When the valve is not in use, it may be closed so as to prevent access of dirt by means of a threaded cap 38.

Assuming the valve to be in a normally closed position, the operator inserts the threaded end of the pipe 12 connected with the end of the tank wagon hose, into the internally threaded neck of the tubular member 11. As the pipe threads are tightened, sufficient force is finally inserted to overcome the friction created by the packing 30 and the spring 26, and thereafter a slight further turning of the pipe 12, approximately one sixth of a turn, causes the tubular member 11 to be rotated to open the valve. Further movement of the tubular member 11 is prevented by the stop 33.

When the operator has finished his delivery and is ready to uncouple the hose, the pipe 12 is backed off and the initial one-sixth turn of this pipe causes the valve members to be moved to fully closed position. Thereafter, the stop 33 causes the tubular member 11 to be held against further rotation so that the thread may be started and the pipe 12 may then be uncoupled. In this way, it is impossible for the operator to open the valve without having the connection to pipe 12, and it is also impossible for the operator to uncouple the hose and leave the valve open.

The invention in its broader aspects is not limited to the specific mechanisms shown and described but departures may be made therefrom within the scope of the accompanying claim without departing from the principles of the invention and without sacrificing its chief advantages.

What I claim is:

A coupling actuated valve adapted to be interposed between two pipe sections, comprising an apertured disc-like member clamped to the end of one of said sections by a hollow sleeve-like element extending outwardly from the end of one of said pipe sections, and a rotatable member having apertures adapted to register with the first apertures housed in said hollow sleeve and secured to said disk-like member by means acting to constantly urge them into frictional engagement, said rotatable member having a sleeve adapted to be threadedly engaged with one of said pipe sections and enclosed by said hollow sleeve-like element, frictional rotation resisting means interposed between said hollow sleeve and said rotatable member, the construction and arrangement being such that when the second named pipe is fully seated in said sleeve, further rotation thereof will rotate the rotatable member with respect to the disc-like member to operate said valve and force applied to disengage said pipe from said sleeve will cause reverse rotation of said movable members, there being stop means for limiting relative rotation between said disc and rotatable member.

ROBERT D. MARX.